(12) United States Patent
Ko et al.

(10) Patent No.: US 10,960,638 B2
(45) Date of Patent: Mar. 30, 2021

(54) SEALABLE LIDDING FILM FOR DISCHARGING GAS AND FOOD CONTAINER SEALED WITH THE SAME

(71) Applicants: Daesang Corporation, Seoul (KR); Yoon Sub Soh, Yongin-si (KR)

(72) Inventors: Hye Kyoung Ko, Seoul (KR); Yoon Sub Soh, Yongin-si (KR)

(73) Assignees: DAESANG CORPORATION; Yoon Sub Soh

( * ) Notice: Subject to any disclaimer, the term of this patent is extended or adjusted under 35 U.S.C. 154(b) by 12 days.

(21) Appl. No.: 16/369,772

(22) Filed: Mar. 29, 2019

(65) Prior Publication Data
US 2020/0047450 A1    Feb. 13, 2020

(30) Foreign Application Priority Data
Aug. 8, 2018    (KR) .......................... 10-2018-0092548

(51) Int. Cl.
*B32B 3/26*    (2006.01)
*B65D 53/04*    (2006.01)
(Continued)

(52) U.S. Cl.
CPC .............. *B32B 3/266* (2013.01); *B32B 37/30* (2013.01); *B32B 38/0032* (2013.01);
(Continued)

(58) Field of Classification Search
CPC ..... B32B 3/266; B32B 37/30; B32B 38/0032; B65D 53/04; B65D 2205/02;
(Continued)

(56) References Cited

U.S. PATENT DOCUMENTS 4,404,241 A * 9/1983 Mueller ................. B32B 27/10
383/103
5,114,766 A * 5/1992 Jacques .............. B65D 81/3453
206/484.2
(Continued)

FOREIGN PATENT DOCUMENTS

JP    H0891450    4/1996
JP    2009091039    4/2009
(Continued)

OTHER PUBLICATIONS

Machine translation of JP 2013-184740 provided by Espacenet. (Year: 2020).*

*Primary Examiner* — James N Smalley
(74) *Attorney, Agent, or Firm* — Myers Bigel, P.A.

(57) ABSTRACT

A sealable lidding film for discharging gas according to an exemplary embodiment of the present invention may seal an opening of a main body, has a structure in which a first layer and a second layer, which are configured such that gas flows between one surface and the other surface, are stacked, and may include lamination portions which are formed by partially laminating the first layer and the second layer; and gap portions which are regions other than regions of the lamination portions and have spaces formed between the first layer and the second layer so that the gas flows in the spaces. According to the sealable lidding film for discharging gas, the spaces, in which the gas may flow, are formed by partially laminating the first and second layers having the fine bores, and as a result, it is possible to prevent expansion and deformation of the sealable lidding film or the container by smoothly discharging the gas created in the container.

7 Claims, 5 Drawing Sheets

(51) Int. Cl.
*B32B 37/30* (2006.01)
*B32B 38/00* (2006.01)

(52) U.S. Cl.
CPC .......... *B65D 53/04* (2013.01); *B65D 2205/02* (2013.01); *B65D 2251/20* (2013.01)

(58) Field of Classification Search
CPC ............ B65D 2251/20; B65D 77/2024; B65D 51/1611; B65D 77/20; B65D 2577/2091; A23L 19/20
USPC ................................................. 215/260, 261
See application file for complete search history.

(56) References Cited

U.S. PATENT DOCUMENTS

| | | | | |
|---|---|---|---|---|
| 6,032,800 | A * | 3/2000 | Kocher | ...................... B32B 7/06 206/459.5 |
| 6,182,850 | B1 | 2/2001 | Marbler et al. | |
| 2004/0028851 | A1* | 2/2004 | Okhai | ...................... B32B 27/08 428/35.2 |
| 2005/0003150 | A1* | 1/2005 | Lin | ......................... B32B 3/266 428/131 |
| 2009/0230078 | A1* | 9/2009 | Walsh | ................ B65D 51/1616 215/261 |
| 2017/0190144 | A1* | 7/2017 | Ito | .......................... B65D 65/40 |

FOREIGN PATENT DOCUMENTS

| | | |
|---|---|---|
| JP | 2013184740 | 9/2013 |
| KR | 20-0438848 | 2/2008 |
| KR | 20180009641 | 1/2018 |

* cited by examiner

[Figure 1]
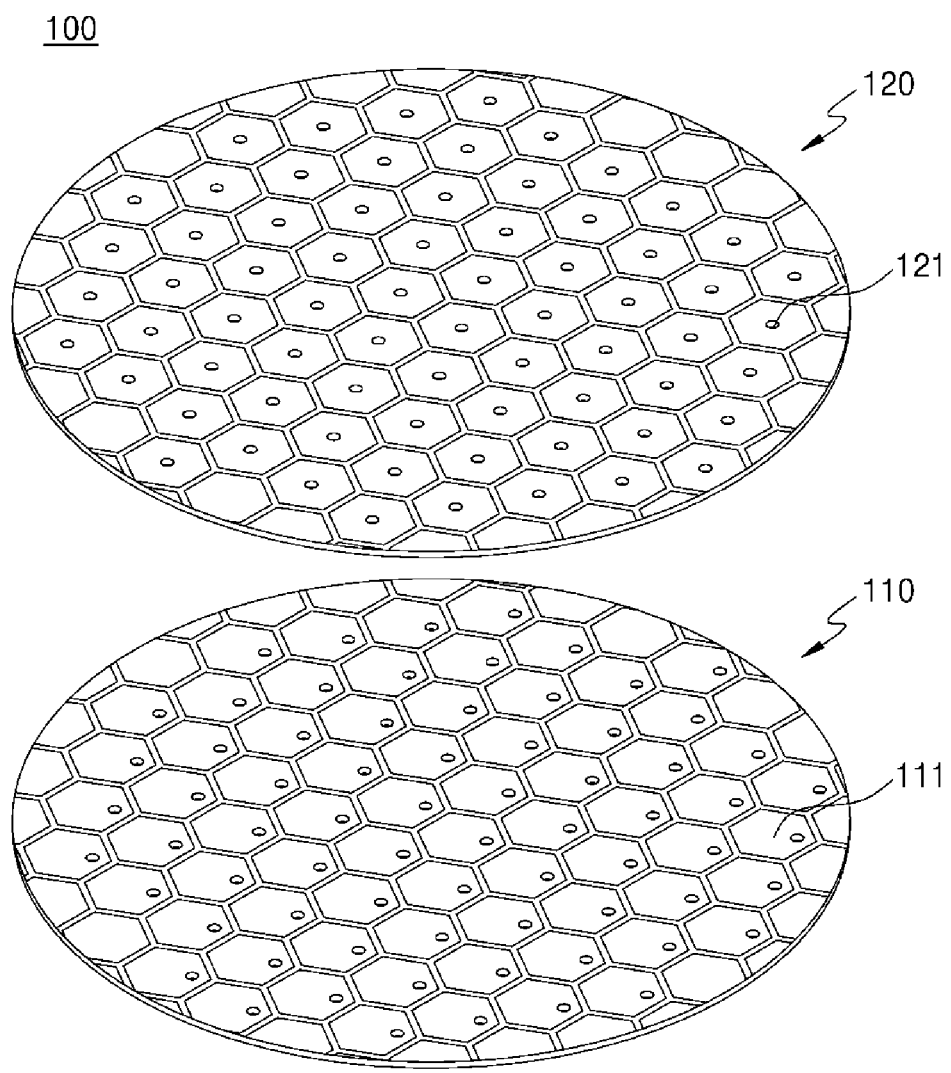

[Figure 2]
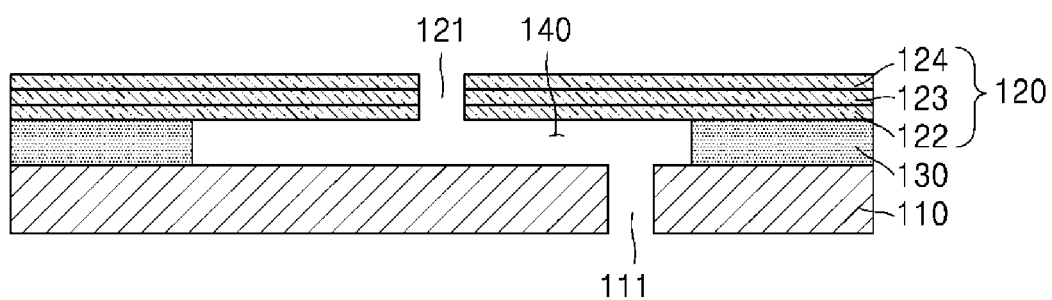

[Figure 3]
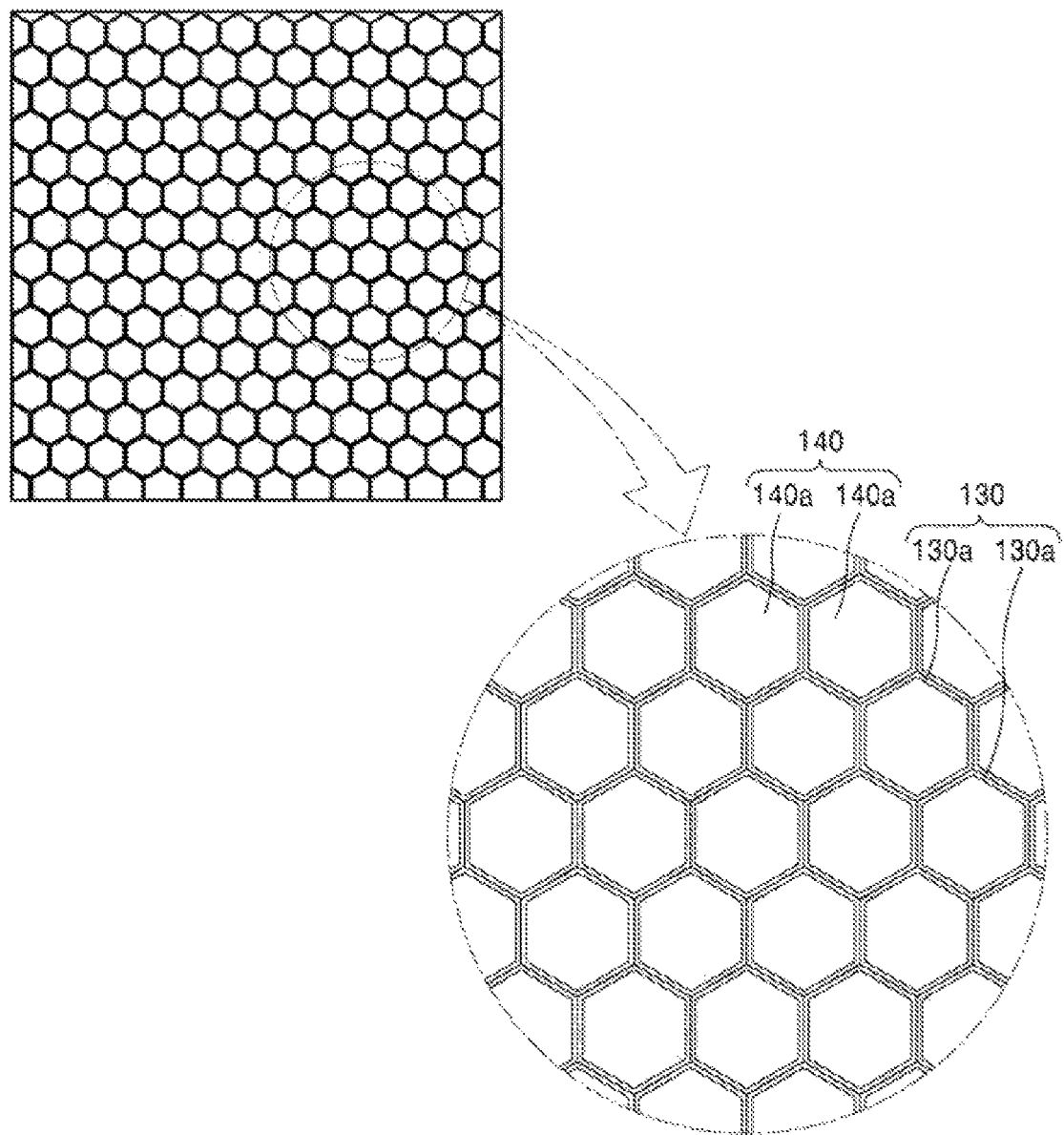

[Figure 4]
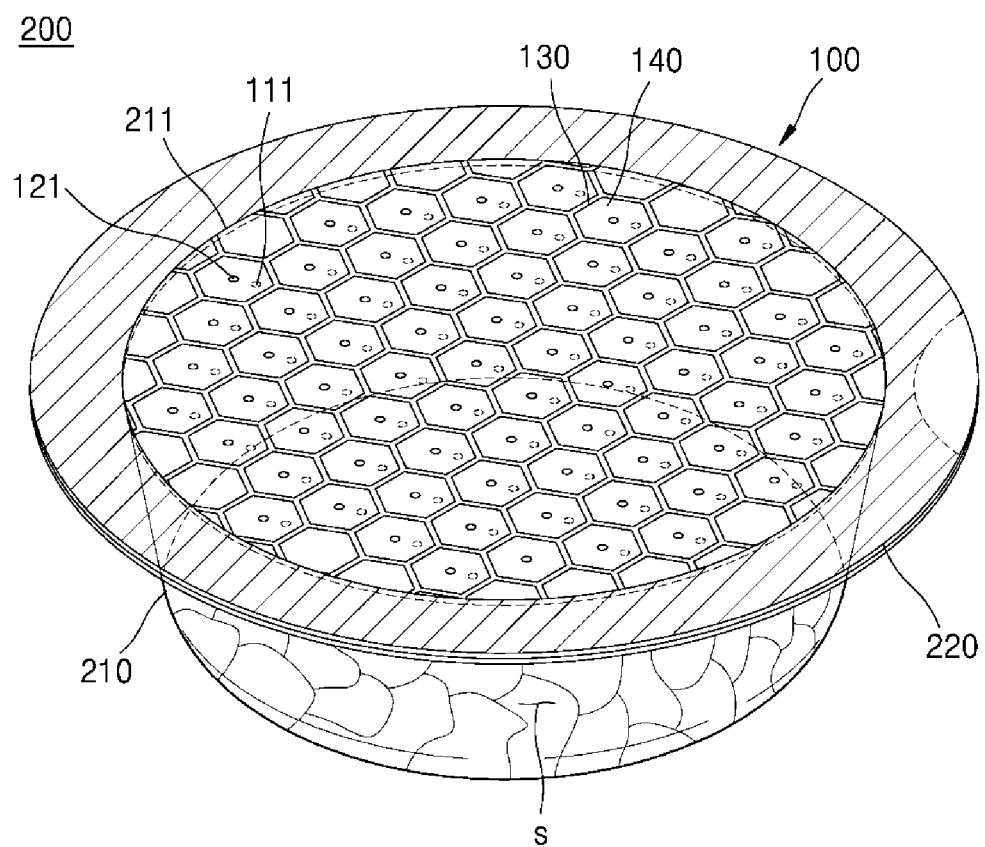

[Figure 5]
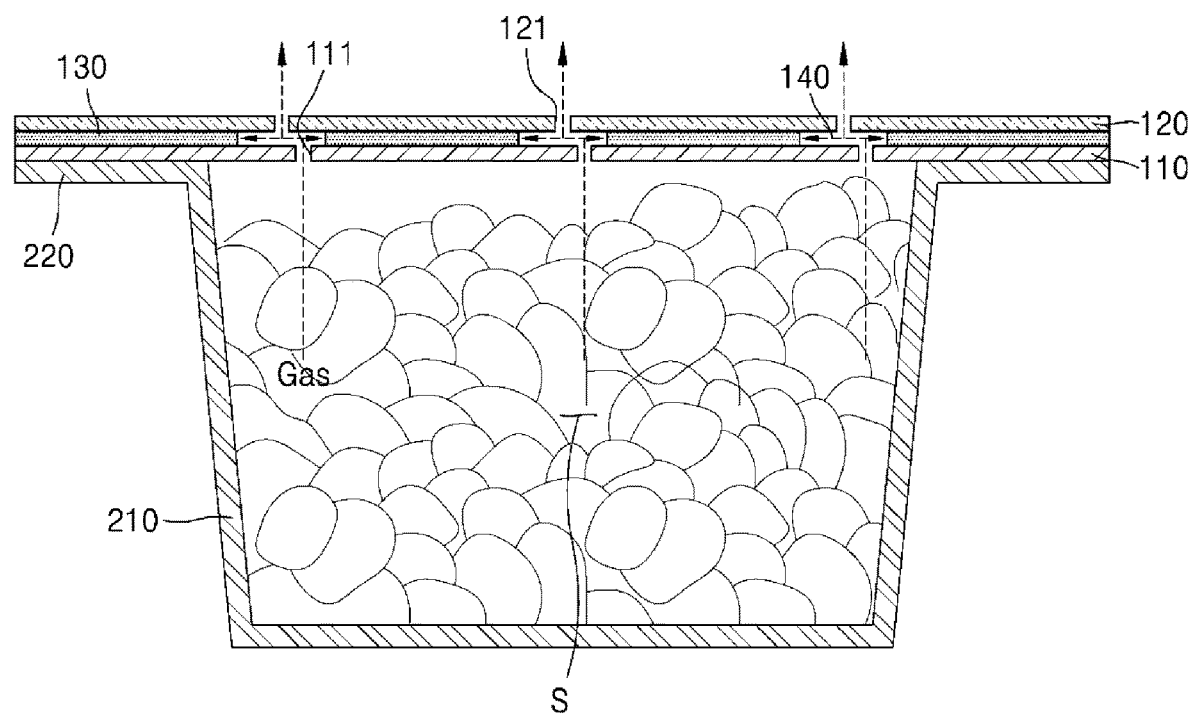

SEALABLE LIDDING FILM FOR DISCHARGING GAS AND FOOD CONTAINER SEALED WITH THE SAME

CROSS-REFERENCE TO RELATED APPLICATIONS

This application claims priority to and the benefit of Korean Patent Application No. 10-2018-0092548 filed in the Korean Intellectual Property Office on Aug. 8, 2018, the entire contents of which are incorporated herein by reference.

TECHNICAL FIELD

The present invention relates to a sealable lidding film for discharging gas and a food container sealed with the sealable lidding film.

BACKGROUND ART

Taste of fermented food such as Kimchi may be easily spoiled when the fermented food comes into contact with air, and therefore, the fermented food is commercially distributed and sold in a state in which the fermented food is stored in a container with ensured leakproof sealability.

In the related art, in order to package the fermented food such as Kimchi, a flange surface, which is formed along a circumference of an opening of the container, is sealed with a sealable lidding film by using heat. However, in a case in which the food container is manufactured by considering only the leakproof sealability, there is a problem in that carbon dioxide gas, which is generated by microorganisms existing in the fermented food during a process of fermenting the food, is not appropriately discharged, and as a result, a packaged state is deformed due to the expansion of the sealable lidding film.

Therefore, the fermented food is sold in a state in which a gas absorbent capable of absorbing carbon dioxide is attached to an inner surface of the sealable lidding film that seals the container. However, because the gas absorbent selectively absorbs only the carbon dioxide gas, nitrogen or oxygen gas included in air, which is introduced into the container while the container is repeatedly used by being opened and closed, remains in the container without being removed. Therefore, the gas absorbent is not considered as a solution for perfectly solving the problem of the deformation of the package.

There is a problem in that the sealable lidding film cannot perfectly prevent a liquid leakage that occurs when the container sways or falls down and thus a liquid substance permeates into a sealed portion during the process of transporting products. In particular, there is a problem in that the gas absorbent cannot perform its own function if the gas absorbent is immersed in Kimchi juice.

SUMMARY OF THE INVENTION

The present invention has been made in an effort to provide a sealable lidding film for discharging gas and a food container sealed with the sealable lidding film, which are capable of preventing a liquid leakage while discharging gas created in the container to the outside.

An exemplary embodiment of the present invention provides a sealable lidding film for discharging gas which seals an opening of a main body and has a structure in which a first layer and a second layer, which are configured such that gas flows between one surface and the other surface, are stacked, the sealable lidding film including: lamination portions which are formed by partially laminating the first layer and the second layer; and gap portions which are regions other than regions of the lamination portions and have spaces formed between the first layer and the second layer so that the gas flows in the spaces.

In the present exemplary embodiment, fine bores may be formed in the first layer and the second layer.

In the present exemplary embodiment, the fine bore may be sized to allow only gas, between liquid and gas, to selectively penetrate through the fine bore.

In the present exemplary embodiment, the fine bores may be formed in the regions of the first and second layers that correspond to the regions of the gap portions.

In the present exemplary embodiment, the fine bores formed in the first layer and the fine bores formed in the second layer may be arranged in a staggered manner.

In the present exemplary embodiment, the first layer and the second layer may have a waterproof property.

In the present exemplary embodiment, the lamination portions may include multiple unit lamination portions which each define a closed curve, and the gap portions may include multiple unit gap portions which each are defined as a region inside the closed curve of the unit lamination portion.

Another exemplary embodiment of the present invention provides a food container including: a main body which has therein an accommodation space for accommodating food and has an opening at one side thereof; a flange surface which is formed along a circumference of the opening of the main body; and the sealable lidding film for discharging gas according to any one of claims 1 to 7 which is attached to the flange surface to seal the opening of the main body, in which the food container may be sealed with the sealable lidding film.

According to the sealable lidding film for discharging gas according to the present exemplary embodiment, the spaces, in which the gas may flow, are formed by partially laminating the first and second layers having the fine bores, and as a result, it is possible to prevent expansion and deformation of the sealable lidding film or the container by smoothly discharging the gas created in the container.

According to the present exemplary embodiment, since the sealable lidding film having the waterproof property is used, it is possible to prevent a leakage of liquid contents through the sealed portion between the container and the sealable lidding film even though the container sways or falls down while the container is being conveyed.

BRIEF DESCRIPTION OF THE DRAWINGS

FIG. 1 is a perspective view illustrating a stack structure of a sealable lidding film for discharging gas according to an exemplary embodiment of the present invention.

FIG. 2 is a cross-sectional view illustrating the stack structure of the sealable lidding film for discharging gas according to the exemplary embodiment of the present invention.

FIG. 3 is an enlarged view of lamination portions and gap portions of the sealable lidding film according to the exemplary embodiment of the present invention.

FIG. 4 is a view illustrating a food container according to the exemplary embodiment of the present invention.

FIG. 5 is a view illustrating a movement route of gas through the food container sealed with the sealable lidding

DETAILED DESCRIPTION

Hereinafter, exemplary embodiments of the present invention will be described in more detail with reference to the accompanying drawings.

The present invention relates to a sealable lidding film 100 for discharging gas and a food container 200 including the sealable lidding film 100 which are configured to prevent a liquid leakage while discharging other gas in the container and carbon dioxide gas created during a process in which microorganisms existing in fermented food ferment the food.

FIG. 1 is a perspective view illustrating a stack structure of a sealable lidding film for discharging gas according to an exemplary embodiment of the present invention, FIG. 2 is a cross-sectional view illustrating the stack structure of the sealable lidding film for discharging gas according to the exemplary embodiment of the present invention, and FIG. 3 is an enlarged view of lamination portions and gap portions of the sealable lidding film according to the exemplary embodiment of the present invention.

FIG. 1 illustrates a state in which stacked first and second layers 110 and 120 are disassembled, and also illustrates lamination portions 130 and gap portions 140 which are formed after the first layer 110 and the second layer 120 are laminated. Meanwhile, fine bores 111 and 121, which are formed in the gap portions 140 and will be described below, are not illustrated in FIG. 3 in order to show only the lamination portions 130 and the gap portions 140.

The sealable lidding film 100 for discharging gas according to the exemplary embodiment of the present invention has a structure in which the first layer 110 and the second layer 120 are sequentially stacked so that gas may flow between one surface and the other surface, and the first layer 110 and the second layer 120 may be partially laminated. The first layer 110 and the second layer 120, which are partially laminated, have the same size and the same shape, such that the first layer 110 and the second layer 120 may completely overlap each other vertically.

The sealable lidding film 100 for discharging gas may include the lamination portions 130 which correspond to regions in which the first layer 110 and the second layer 120 are partially laminated, and gap portions 140 which are regions other than the regions of the lamination portions 130 and have spaces formed as the first layer 110 and the second layer 120 are spaced apart from each other.

The lamination portion 130 is the region in which the first layer 110 and the second layer 120 are locally laminated and in close contact with each other, such that the gas created in the container cannot be discharged to the outside through the lamination portion 130. In contrast, the gap portion 140 is the region in which the first layer 110 and the second layer 120 are not laminated, such that the gas created in the container may flow through the gap portion 140 and may be discharged to the outside.

The lamination portions 130 may include multiple unit lamination portions 130a, each of which defines a closed curve. The gap portions 140 may include multiple unit gap portions 140a, each of which is defined as a region inside the unit lamination portion 130a that defines the closed curve.

For example, as illustrated in FIG. 3, the sealable lidding film 100 for discharging gas according to the exemplary embodiment of the present invention may have a honeycomb pattern. In this case, the unit lamination portion 130a, which defines the closed curve, corresponds to a circumference of the unit gap portion 140a having a regular hexagonal shape, and may be connected to the neighboring unit lamination portions 130a to constitute the continuous lamination portions 130.

The first layer 110 and the second layer 120 may be partially laminated so that the lamination portions 130 and the gap portions 140 define other patterns instead of the honeycomb pattern. In addition, as illustrated in FIG. 3, the gap portions 140 may include the multiple unit gap portions 140a which are regularly formed, but the gap portions 140 may include multiple unit gap portions 140a having different shapes.

Meanwhile, fine bores may be formed in the stacked first and second layers 110 and 120, respectively. Hereinafter, the fine bore formed in the first layer 110 is defined as a first fine bore 111, and the fine bore formed in the second layer 120 is defined as a second fine bore 121.

The first fine bore 111 and the second fine bore 121 may be formed to have a size, for example, a diameter of 100 microns or less, which may substantially allow only gas to selectively penetrate through the first and second fine bores 111 and 121 even though liquids and gas are created in the container. Each of the first fine bore 111 and the second fine bore 121 may be selectively formed within the corresponding diameter range depending on types of contents. The first fine bore 111 and the second fine bore 121 may be formed to have the same size, but the first fine bore 111 and the second fine bore 121 may be formed to have different sizes. That is, the first fine bore 111 and the second fine bore 121 may be freely formed to be sized such that the gas may penetrate through the first fine bore 111 and the second fine bore 121 while the liquid cannot penetrate through the first fine bore 111 and the second fine bore 121. The first fine bore 111 and the second fine bore 121 may be formed by needle punching or the like.

The fine bores may be formed in the regions of the first layer 110 and the second layer 120 that correspond to the regions of the gap portions 140. The first fine bores 111 formed in the first layer 110 and the second fine bores 121 formed in the second layer 120 may be arranged in a staggered manner.

If the first fine bore 111 and the second fine bore 121 are formed to face each other, there is a risk that the liquid in the food container 200 may leak immediately to the outside through the second fine bore 121 as the first fine bore 111 is also expanded when high pressure is applied to the first fine bore 111 due to expansion of the gas in the food container 200. Therefore, the first fine bores 111 and the second fine bores 121 may be arranged in a staggered manner in the first layer 110 and the second layer 120, respectively.

The first fine bores 111 and the second fine bores 121 may be formed at constant intervals in the regions of the first layer 110 and the second layer 120, respectively, which correspond to the regions of the gap portions 140. However, the interval between the first fine bores 111 or between the second fine bores 121 may vary, or the number of first fine bores 111 or the number of second fine bores 121 may vary.

Meanwhile, the first layer 110 and/or the second layer 120 may be formed by stacking various types of materials or may be made of a waterproof material in order to prevent a liquid leakage.

For example, referring to FIG. 2, the first layer 110 is a portion to be directly attached to the food container 200 and may be configured as a film made of an easy-open material so that the first layer 110 is easily separated from the food container 200 in use. In addition, the easy-open film may be made of a porous material in order to improve gas permeability.

The second layer 120 is a layer on which a trademark and/or a design image related to the food container 200 is printed. The second layer 120 may be formed by sequentially stacking different PE layers 122 and 123 and a PET layer 124. Hereinafter, the different PE layers 122 and 123 are defined as a first PE layer 122 and a second PE layer 123. In the stack structure that constitutes the second layer 120, the first PE layer 122 may be partially laminated on the first layer 110 to form the gap portions 140 together with the first layer 110. In this case, the first PE layer 122 may be made of linear low density polyethylene (LLDPE), low density polyethylene (LDPE), or the like that offers excellent workability and flexibility.

PE containing an opalizer may be used as the material of the second PE layer 123, and the trademark and/or the design image may be printed on an upper surface of the PET layer 124.

Next, the food container 200 sealed with the sealable lidding film 100 for discharging gas will be described.

FIG. 4 is a view illustrating the food container according to the exemplary embodiment of the present invention, and FIG. 5 is a view illustrating a movement route of gas through the food container sealed with the sealable lidding film for discharging gas according to the exemplary embodiment of the present invention.

Referring to FIG. 4, the food container 200 according to the exemplary embodiment of the present invention has therein an accommodation space S for accommodating food, and may include a main body 210 which has an opening 211 at one side thereof, a flange surface 220 which is formed along a circumference of the opening 211 of the main body 210, and the sealable lidding film 100 for discharging gas according to any one of claims 1 to 7 which is attached to the flange surface 220 to seal the opening 211 of the main body 210.

The flange surface 220 is formed outward on the main body 210 along the circumference of the opening 211 and may be coupled, by heat, to the sealable lidding film 100 according to the exemplary embodiment of the present invention. In this case, a portion of the sealable lidding film 100, which is coupled to the flange surface 220, cannot have a space through which gas may be discharged, and as a result, during the process of manufacturing the sealable lidding film 100, the fine bores 111 and 121 may not be formed in the regions of the first and second layers 110 and 120 which are coupled to the flange surface 220.

That is, as illustrated in FIG. 4, the fine bores 111 and 121 may be formed only in the region of the sealable lidding film 100 that corresponds to the opening 211 of the main body 210 when the food container 200 is sealed with the sealable lidding film 100. The gas created in the food container 200 may be discharged to the outside through the first fine bores 111 and the second fine bores 121 which are arranged in a staggered manner in the gap portions 140 of the sealable lidding film 100.

As illustrated in FIG. 5, the first fine bores 111 and the second fine bores 121 may be arranged in a staggered manner in the gap portions 140. The first fine bores 111 and the second fine bores 121 may be formed in the region of the unit gap portion 140a in a state in which the first fine bores 111 and the second fine bores 121 are different in number from each other.

As described above, the sealable lidding film 100 for discharging gas according to the exemplary embodiment of the present invention has the first layer 110 and the second layer 120 in which the fine bores 111 and 121 are formed, such that the gas created in the food container 200 is discharged to the outside, thereby preventing expansion and deformation of the container.

According to the sealable lidding film 100 for discharging gas according to the present exemplary embodiment, the first layer 110 and the second layer 120 are partially laminated to form the spaces, that is, the gap portions 140 in which the gas may flow. Therefore, external pressure of the food container 200 is higher than internal pressure thereof, such that, even though outside air is introduced through the fine bores 121 formed in the second layer 120 of the sealable lidding film 100, the introduced air primarily remains in the gap portion 140, and as a result, until the pressure in the gap portion 140 becomes higher than the internal pressure of the food container 200, it is possible to prevent the outside air from passing through the fine bores 111 of the first layer 110 to contaminate food accommodated in the food container 200.

In the case of a sealable lidding film having a single layer, when the internal pressure of the food container 200 is rapidly increased, the sealable lidding film may be damaged while bursting due to excessive tensile stress even though the sealable lidding film has fine bores. In contrast, in the case of the present exemplary embodiment, the stack structure in which the first layer 110 and the second layer 120 are partially laminated may reduce a degree of deformation of the first layer 110 that faces the interior of the food container 200.

According to the present exemplary embodiment, since the sealable lidding film 100 having the waterproof property is used, it is possible to effectively prevent a leakage of liquid contents through the sealed portion between the food container 200 and the sealable lidding film 100 even though the food container 200 sways or falls down while the food container 200 is being conveyed.

According to the sealable lidding film 100 for discharging gas including the gap portions 140 according to the present exemplary embodiment, even though the fine bores 111 and 121 each have a size that allows a liquid to penetrate through the fine bores 111 and 121 because of errors occurring during the process of forming the fine bores 111 and 121 or because of deformation of the sealable lidding film 100, at least a part of the liquid contents in the food container 200, which leaks through the first fine bores 111 of the first layer 110, may be collected in the gap portions 140 formed between the first layer 110 and the second layer 120 without being immediately discharged through the second fine bores 121 formed in the second layer 120. As a result, it is possible to minimize a liquid leakage.

The food container 200 according to the exemplary embodiment of the present invention is sealed with the sealable lidding film 100 for discharging gas, which has the fine bores 111 and 121 for discharging gas, instead of a gas absorbent in the related art attached to a bottom surface of the sealable lidding film 100, and as a result, it is possible to reduce costs required to package products.

While the present invention has been described with reference to the aforementioned exemplary embodiments, various modifications or alterations may be made without departing from the subject matter and the scope of the invention. Accordingly, the appended claims include the modifications or alterations as long as the modifications or alterations fall within the subject matter of the present invention.

What is claimed is:

1. A sealable lidding film for discharging gas which seals an opening of a main body and has a structure in which a first layer and a second layer are stacked, the sealable lidding film comprising:
   lamination portions which are formed by partially laminating the first layer and the second layer; and
   gap portions which are regions other than regions of the lamination portions and have spaces formed between the first layer and the second layer so that the gas flows in the spaces,
   wherein the lamination portions include multiple unit lamination portions each of which defines a closed curve, and the gap portions include multiple unit gap portions each of which is defined as a region inside the closed curve of the unit lamination portion and has a regular hexagonal shape.

2. The sealable lidding film of claim 1, wherein fine bores are formed in the first layer and the second layer.

3. The sealable lidding film of claim 2, wherein the fine bore is sized to allow only gas, between liquid and gas, to selectively penetrate through the fine bore.

4. The sealable lidding film of claim 2, wherein the fine bores are formed in the regions of the first and second layers that correspond to the regions of the gap portions.

5. The sealable lidding film of claim 2, wherein the fine bores formed in the first layer and the fine bores formed in the second layer are arranged in a staggered manner.

6. The sealable lidding film of claim 1, wherein the first layer and the second layer have a waterproof property.

7. A food container comprising:
   a main body which has therein an accommodation space for accommodating food and has an opening at one side thereof;
   a flange surface which is formed along a circumference of the opening of the main body; and
   the sealable lidding film for discharging gas according to claim 1 which is attached to the flange surface to seal the opening of the main body,
   wherein the food container is sealed with the sealable lidding film.

* * * * *